July 19, 1932. L. W. GREVE 1,868,228
AIRCRAFT STRUT
Filed Oct. 19, 1929
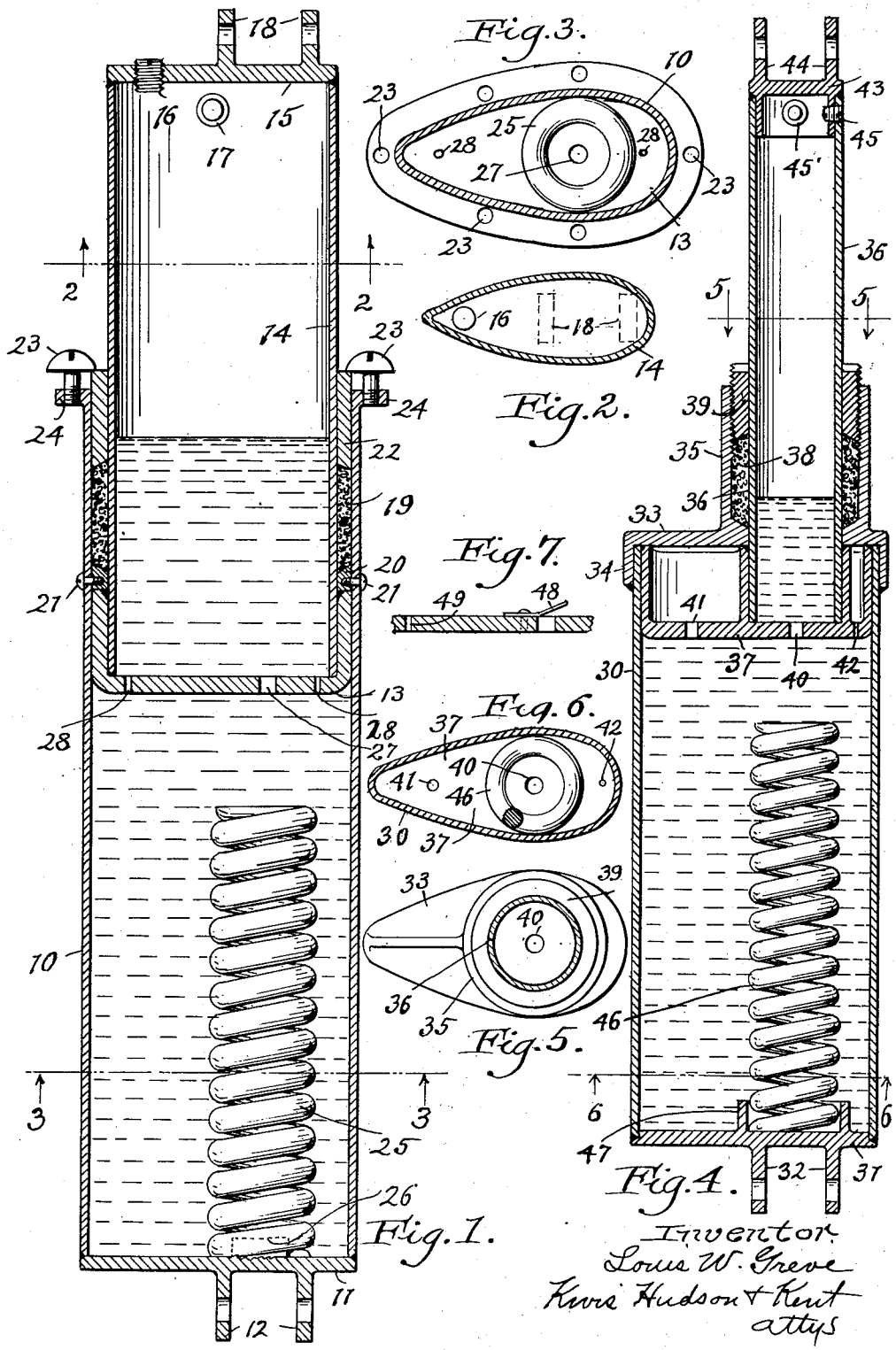

Patented July 19, 1932

1,868,228

UNITED STATES PATENT OFFICE

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO

AIRCRAFT STRUT

Application filed October 19, 1929. Serial No. 400,812.

This invention relates to improvements in aircraft struts, that is to say struts embodying shock absorbing and rebound checking means.

One of the objects of the invention is the provision of a strut of this character so designed as to provide minimum air resistance, and capable at the same time of being packed satisfactorily to prevent leakage of fluid.

Other objects and features of novelty will appear as I proceed with the description of those embodiments of the invention which, for the purposes of the present application, I have illustrated in the accompanying drawing, in which Figure 1 is a central longitudinal section of a shock absorbing strut embodying the invention.

Figs. 2 and 3 are cross sections taken upon the lines 2—2 and 3—3 respectively of Fig. 1.

Fig. 4 is a view similar to Fig. 1, showing a modified form of the invention.

Figs. 5 and 6 are transverse sectional views taken substantially on the line 5—5 and 6—6 respectively of Fig. 4, and Fig. 7 is a detail sectional view illustrating in a more or less diagrammatic manner a one-way valve which may be employed in connection with the invention.

In carrying out the invention I depart from the usual circular form of cylinder and piston and resort to a stream-line form, the primary object of this departure from the conventional being a reduction in air resistance. The packing of a piston having a cross section other than circular affords insurmountable difficulties from a production standpoint. I avoid such difficulties by so designing my shock absorber that the piston may run comparatively freely in its cylinder, there being but one fluid-tight packing required, namely that between the inner end of the cylinder and the piston rod. A packing of this latter type is not only more efficient than a piston packing, but it has the advantage of permitting adjustment from the outside of the strut.

Figs. 1, 2 and 3 of the drawing illustrate a form of the invention in which I employ a cylinder 10, constructed preferably of steel tubing caused to take a stream-line contour. The outer end of this cylinder has a cylinder head 11 which may be welded or otherwise secured thereto so as to provide a fluid-tight joint. Projecting from the head 11 are a pair of brackets 12 by means of which connection may be made with an axle or other part of the running gear of an airplane.

Within the cylinder 11 there is a piston head 13 which has a stream-line contour and is so constructed as to have a sliding fit within the cylinder 10. A hollow piston rod 14, also of stream-line cross section and constructed preferably of steel tubing, is fitted within the skirt of piston 13 and secured thereto by a weld or other suitable means. The outer surface of the piston rod 14 is therefore spaced from the inner surface of the cylinder 10 a distance equal to the thickness of the piston skirt. One end of the hollow piston rod 14 is closed by the piston head 13, and the other end is closed by a plate 15 which may be welded or otherwise joined to the piston rod. This plate 15 is provided with a threaded opening normally closed by a plug 16. Through this opening the shock absorber may be charged with oil or other suitable liquid. The cylinder 14 may have mounted therein an air connection 17 embodying the usual check valve, this connection being employed in the inflation of the strut where shocks are to be taken partly or entirely upon compressed air. Brackets 18 integral with the plate 15 serve for attachment to a wing, the fuselage, or other part of an airplane.

The packing 19 surrounds the piston rod 14 and lies between the same and the inner wall of the cylinder 10. At its lower end this packing abuts against a band 20 secured to the inner wall of the cylinder by screws 21 or the like, this band having the additional function of a stop against which the skirt of piston 13 engages to prevent extension of the strut further than is illustrated in Fig. 1. The upper end of the packing 19 is confined by some suitable means such as a slidable gland band 22, the latter being engaged by the heads of screws 23 that are threaded into a collar 24 which is welded onto the upper end of cylinder 10. Adjustment of the packing 19 may be effected by threading the screws 23 downwardly or upwardly, as will be apparent from an inspection of the drawing.

In the event that it is desired to take the shocks of impact either partially or exclusively by spring means, I place a coil spring 25 in the cylinder 10 before the parts are assembled. This spring is of a diameter just slightly less than the greatest internal transverse dimensions of the cylinder. The side walls of the cylinder are thus utilized as guideways for the spring during its movements of compression and expansion, and as supports to keep the spring always in an upright position. I may employ additionally a projection 26, integral with the cylinder head 11 and extending upwardly into the space surrounded by the spring, although this is not essential.

The strut is intended to be filled with oil or other suitable liquid to approximately the level indicated in Fig. 1, and this is true whether the shocks of impact are to be taken upon the spring 25 or upon compressed air, or upon the two together. The piston head 13 is provided with one or more openings through which the liquid may be metered during the compression and expansion of the telescoping strut members. In Figs. 1 and 3, I have illustrated such an opening at 27, together with two additional openings 28 of a smaller size.

In Fig. 1 the strut is shown in full lines extended to the limit of its expansion. In the same figure the dotted line position of the upper telescoping member is that which it assumes when the strut is loaded, that is when it is supporting its share of the weight of an airplane. At such time the spring 25 is compressed to a relatively slight extent. Shocks of impact then cause the further compression of the spring, or the compression of the spring and the further compression of the air above the liquid if compressed air be employed in connection with the spring. If the spring be omitted and the shocks of impact be taken on compressed air alone, the strut will be inflated sufficiently to enable the compressed air in the upper part thereof to support the load with the upper telescoping member 14 in the dotted line position. In any case, when the strut is compressed, liquid is metered upwardly through openings 27 and 28, and when the rebound occurs liquid is metered downwardly through these same openings, thus delaying or checking the movement of expansion.

In the construction of Figs. 4, 5 and 6 the cylinder 30 is again of stream-line cross section and provided with a cylinder head 31 and brackets 32 for attachment to the running gear. The upper or inner end of the cylinder however is partially closed by a casting 33 which has a downwardly extending flange 34 to receive the wall of the cylinder, this flange being secured to the cylinder by welding or other means of effecting a fluid-tight connection. The casting 33 has an extension 35 of circular contour running parallel to and surrounding the principal axis of the cylinder 30. Within this extension there is slidably mounted a hollow piston rod 36 of cylindrical cross section, to the lower end of which is attached a piston head 37 of stream-line cross section adapted to slide within the cylinder 30. Within the extension 35 and surrounding the piston rod 36 I mount a packing 38 which is held in place and made adjustable by a gland nut 39 that is threaded into the outer end of the extension. The piston head 37 has an opening 40 therethrough to provide a path for fluid flow between the cylinder 30 and the hollow piston rod 36. Other openings 41 and 42 through the piston head may be employed in addition to permit the liquid in the cylinder to transfer itself from one side of the piston head to the other as the piston head moves up and down. The upper end of the hollow piston rod 36 is closed by a plug 43 carrying brackets 44 for attachment to an airplane wing or fuselage. A steel filler plug 45, similar to the plug 16 may be mounted in the hollow piston rod, and provision for admitting compressed air may also be made if desired, the opening for the same being indicated in Fig. 4 at 44'. A coil spring 46, similar to spring 25, may be used in this form of the invention and may be mounted in a manner similar to the mounting of spring 25, although instead of projections 26 on the head 11 the head 31 carries a pair of curved projections 47 exteriorly of the spring.

Where it is considered desirable to permit rapid compression of the telescoping members, that is without any considerable deterrent effect by the liquid, I may employ a one-way valve 48, indicated more or less diagrammatically in Fig. 7, this valve permitting the free flow of liquid from the cylinder into the upper hollow member 14 or 36, as the case may be, during compression of the strut, while preventing or retarding the flow in the opposite direction. One or more constantly open passages 49 may be provided to take care of the metered flow during the rebound stroke.

I prefer to arrange the telescoping parts of the strut in the relation shown in the drawing, that is, with the piston and piston rod constituting the upper member and the cylinder constituting the lower member. However, in one of its broader aspects the invention contemplates the arrangement of these members in reversed position, and in fact, both members may take a horizontal or inclined position rather than a vertical one.

While in the foregoing description and in the accompanying drawing I have illustrated certain forms of the invention more or less in detail, I desire it to be understood that such detail disclosure is resorted to primarily for the purpose of fully illustrating the invention and is not to be considered as limiting the scope thereof.

Having thus described my invention, I claim:

1. In a shock absorber, a cylinder and a piston adapted to be connected between the elements whose movements are to be cushioned, said cylinder having curved walls elongated at right angles to their length, said piston having a corresponding cross section, and means within the cylinder for cushioning the relative movements of the cylinder and piston.

2. In a shock absorber, a cylinder and a hollow piston rod adapted to be connected between the elements whose movements are to be cushioned, said cylinder having curved walls elongated at right angles to their length, a piston therefor of corresponding cross section attached to said piston rod, said piston having an opening therethrough in alignment with the interior of the hollow rod, and means for cushioning the relative movements of said cylinder and piston comprising a liquid adapted to flow through said opening.

3. In a shock absorber, a cylinder having an outer wall of stream-line contour, a piston slidable in said cylinder, and a piston rod therefor having an outer wall of stream-line contour telescoping with said cylinder, whereby the shock absorber is stream-lined throughout its length when fully expanded and when partially or fully compressed.

4. In a shock absorber, two telescoping members of stream-line contour transversely, said inner member comprising a piston slidable within the outer member, fluid-tight packing between said members, and fluid means for checking sudden relative movements of said telescoping members.

5. In a shock absorber, two hollow telescoping members of stream-line contour transversely, said inner member comprising a piston slidable within the outer member, said piston having an opening therethrough providing a path for fluid flow between the hollow members, and fluid means for checking sudden relative movements of said telescoping members.

6. In a shock absorber, a cylinder of stream-line contour transversely, a piston slidable in said cylinder, a piston rod therefor of stream-line contour spaced inwardly from the inner wall of said cylinder, and fluid-tight packing between the inner end of said cylinder and said piston rod.

7. In a shock absorber, a cylinder of stream-line contour transversely, a hollow extension of circular contour for the inner end of said cylinder, a piston rod therefor of circular contour, and fluid-tight packing between said extension and piston rod.

8. In a shock absorber, a cylinder of stream-line contour transversely, a hollow extension of circular contour for the inner end of said cylinder, a hollow piston rod therefor of circular contour, a fluid-tight packing between said extension and piston rod, and means permitting fluid flow between said cylinder and the interior of said hollow piston rod.

9. In a shock absorber, a cylinder of stream-line cross section, a piston also of stream-line cross section working in said cylinder, and a coil spring mounted between said piston and the head of said cylinder, the outer diameter of said spring approximating the greatest inner diameter of said cylinder, whereby the spring is guided and supported against lateral movement.

In testimony whereof, I hereunto affix my signature.

LOUIS W. GREVE.